United States Patent [19]
Lefeuvre

[11] 3,983,767
[45] Oct. 5, 1976

[54] RETURN APPARATUS FOR THE ACCELERATOR PEDAL OF A VEHICLE

[75] Inventor: Andre Lefeuvre, Noisy-le-Roi, France

[73] Assignees: Regie Nationale des Usines Renault; Automobiles Peugeot, both of France

[22] Filed: Sept. 19, 1974

[21] Appl. No.: 507,479

[30] Foreign Application Priority Data
Sept. 20, 1973 France .................................. 73.33813

[52] U.S. Cl. ............................... 74/513; 180/110; 180/105 R; 123/102
[51] Int. Cl.² ................................................. G05G 1/14
[58] Field of Search .................... 74/513, 516, 512; 180/105 E, 105 R, 108, 110; 123/103 E, 103 R, 102

[56] References Cited
UNITED STATES PATENTS

| | | | |
|---|---|---|---|
| 2,471,690 | 5/1949 | Howland | 123/102 X |
| 2,822,881 | 2/1958 | Treharne | 180/110 |
| 2,868,035 | 1/1969 | Mudon | 74/513 |
| 3,207,255 | 9/1965 | Hahlganss et al. | 180/105 R |
| 3,476,205 | 11/1969 | Kato | 180/105 R |
| 3,547,216 | 12/1970 | Marie | 180/108 |

Primary Examiner—William F. O'Dea
Assistant Examiner—Harold Joyce
Attorney, Agent, or Firm—Bucknam and Archer

[57] ABSTRACT

A cable is mounted on a winding drum coupled with the output shaft of a reversible motor which is caused to rotate by control means when an operating parameter of the vehicle exceeds or goes below a predetermined value. The cable is kept taut and its free end is connected by resilient means to a mobile member which is connected to the accelerator control linkage.

3 Claims, 1 Drawing Figure

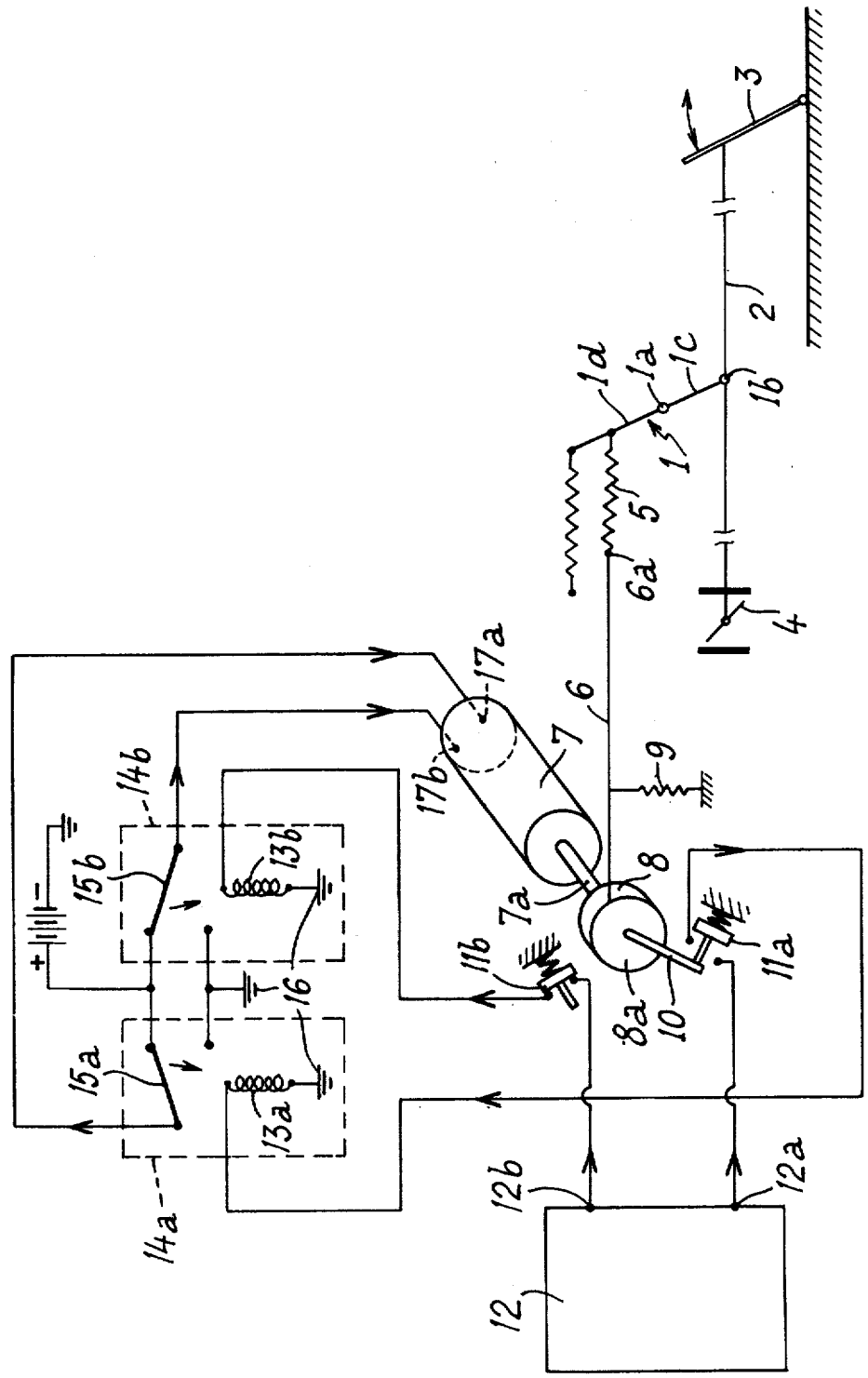

RETURN APPARATUS FOR THE ACCELERATOR PEDAL OF A VEHICLE

The present invention relates to return apparatus for the accelerator pedal of a vehicle, comprising a first mobile member connected to the accelerator control linkage and connected by resilient means to a second mobile member controlled by a reversible motor which is caused to rotate by control means when an operating parameter of the vehicle exceeds or goes below a predetermined value.

In a conventional apparatus of this type, the second mobile member is a lever controlled by a push rod which is itself a lever controlled by the reversible motor. This type of apparatus is complicated and is subject to wear because the second mobile member is actuated by simple mechanical contact with the other lever; this leads to the risk of breakdown and degredation of the component parts.

The present invention has as its main aim the production of an accelerator pedal return apparatus which is simple and reliable.

In accordance with the present invention the second mobile member comprises a cable which is mounted on a winding drum coupled with the output shaft of the reversible motor, the cable being connected to means for applying tension to the cable, the free end of the cable being connected to the first mobile member by the resilient means.

There is thus no abrasive contact between two mobile members, but a permanent mechanical link between the cable, which is continuously held taut by the tension applying means (e.g. a tension spring) and the winding drum, which is the member transmitting motion from the motor to the cable.

Further advantages and features of the invention will be better understood from the following description of an embodiment with reference to the accompanying drawing, in which the single FIGURE illustrates a diagrammatic and partially perspective view of a pedal return apparatus.

The apparatus shown comprises a first mobile member which is a two-arm lever 1 pivoting about a fixed shaft 1a and connected, by an articulation 1b at the end of one of its arms 1c, to a rod 2 which forms part of the accelerator pedal control linkage 3 of a vehicle and which is connected to the control valve 4 of the carburettor of the vehicle. The other arm 1d of the lever 1 is connected by a resilient member 5 to a second mobile member 6 controlled by a reversible electric motor 7 which is itself, as will be described below, caused to rotate in the appropriate direction by control means when an operating parameter of the vehicle, for example the real speed of the vehicle or the normal performance of its engine, exceeds or goes below a predetermined value.

The second mobile member comprises a cable 6 mounted on a winding drum 8 coupled to the output shaft 7a of the control motor 7. The cable 6 is connected to a tension spring 9 so as to be kept continuously taut and connected at its free end 6a (remote from the drum 8) to the lever 1 by the resilient member 5.

The resilient member 5 is a helicoidal spring with contiguous turns, calibrated so that it only extends if the load exerted on the accelerator pedal 3 by the driver of the vehicle, when pedal return is ordered, exceeds a given value.

The winding drum 8 is rotationally coupled to a member 10 which in the present embodiment is secured on the free end 8a of the drum 8. At either of its two extreme angular positions, which correspond to the return and nonreturn of the pedal 3 respectively, the member 10 can open a limit switch 11a, 11b, normally closed, between the terminal 12a, 12b of a computer 12 and the excitation coil 13a, 13b of a relay switch 14a, 14b. The contactor 15a, 15b of each of the relay switches 14a, 14b is connected selectively between earth 16 or a current source (the positive battery terminal) and an input terminal 17a, 17b of the motor 7; the motor 7 is a d.c. electric motor designed to run in either direction according to the direction of the supply current fed to the motor via its terminals 17a and 17b.

The computer 12 supplies each of its output terminals 12a, 12b with a control signal whenever the operating parameter of the vehicle which it monitors exceeds or goes below a predetermined value respectively.

The contactors 15a and 15b are normally in the position shown: when the contactors 15a, 15b are in this position the two terminals 17a and 17b of the motor 7 are short-circuited and the motor is stopped.

The circuit has thus been illustrated in a position which corresponds to the limit of activation of the pedal return, the contactor 11a being set in an open position by the rod 10, thus allowing the contactor 15a to return to or remain in its normal position as illustrated. As soon as the operating parameter of the vehicle goes below a predetermined value the signal at the output terminal 12a of the computer disappears and a signal appears at the terminal 12b which causes the coil 13b to actuate the contactor 15b, which then moves to connect the terminal 17b to earth 16; this results in the motor 7 being supplied with a current which causes the motor 7 to turn in the direction which slackens the cable 6, until the rod 10 actuates the contactor 11b, which opens and cancels the signal at the terminal 12b.

The electromechanical embodiment of the control means 14a, 14b controlling the rotational direction of motor 7 may be replaced by semiconductor electronic devices.

I claim:

1. In a vehicle having an accelerator pedal, an accelerator control linkage, and an accelerator pedal return apparatus comprising a reversible motor, control means for causing the motor to rotate when an operating parameter of the vehicle exceeds or goes below a predetermined value, a first mobile member connected to the accelerator control linkage, a second mobile member controlled by the reversible motor, and resilient means connecting the first mobile member to the second mobile member: the improvement comprising a winding drum coupled with an output shaft of the reversible motor, the second mobile member being a cable which is mounted on the winding drum and whose free end is connected to the first mobile member by the resilient means, and means for applying tension to the cable, said first mobile member being a lever pivotally connected at one end to the accelerator control linkage and supported for pivotal movement about a fixed axis located between said end and the point of connection of said resilient means.

2. The improvement according to claim 1, wherein said resilient means comprises a calibrated spring with contiguous turns.

3. The improvement according to claim 1, further comprising a computer having two output terminals, the computer emitting a control signal at a respective one of its output terminals when said operating parameter of the vehicle respectively exceeds or goes below a predetermined value, two relay switches each having an excitation coil and a contactor positioned selectively between earth or a current source and a respective input terminal of the motor, two limit switches each positioned between a respective output terminal of the computer and the excitation coil of a respective relay switch, and a rotatable member which at each of two rotational positions opens a respective one of the limit switches, the rotatable member being rotationally coupled to the winding drum.

* * * * *